United States Patent Office 2,873,257
Patented Feb. 10, 1959

2,873,257

METHOD OF CATALYST PREPARATION

Edward Allen Hunter, Baton Rouge, and Elroy Merle Gladrow, East Baton Rouge, La., assignors to Esso Research and Engineering Company, a corporation of Delaware No Drawing. Application June 14, 1955
Serial No. 515,544

7 Claims. (Cl. 252—465)

This invention concerns a novel and improved technique for producing or manufacturing catalyst of the cobalt molybdate type supported on a carrier such as alumina. The invention particularly resides in a satisfactory manner for simply and effectively impregnating catalyst carriers with cobalt molybdate to attain desirable and active catalysts.

In recent years a variety of hydrogenation and dehydrogenation processes have attained commercial interest. One such process which is becoming extensively employed on a commercial scale is the so-called hydrofining process. In a hydrofining operation, a petroleum product such as naphtha, heating oil, or other petroleum fractions are subjected to rather mild conditions of hydrogenation, so as to secure distinct improvements in the quality of the product. Other similar and related processes are hydrodesulfurization, hydroforming, hydrocracking, and the like.

A catalyst which has been found of particular value for processes of this character constitutes cobalt molybdate supported on a carrier material which is preferably alumina. Desirable and active cobalt molybdate alumina catalysts are now known and are commercially available. Considering practical and commercial requirements encountered in manufacture of such catalysts, the need has become apparent however, for improved techniques for manufacturing such a catalyst. A basic difficulty is the fact that cobalt molybdate is not soluble in water so that cumbersome and expensive expedients have been necessitated for impregnating a carrier with cobalt molybdate. This problem has been particularly aggravated by the fact that it has heretofore been impossible to obtain a catalyst of desirable activity by admixing pre-formed or precipitated cobalt molybdate with the carrier. All the techniques now known for circumventing this problem are subject to technical or practical deficiencies resulting in catalysts of inferior quality and/or unduly increasing the production complexity and the resultant catalyst cost.

In accordance with the present invention, a remarkably simple and effective manner has been found for impregnating a carrier with cobalt molybdate so as to provide a catalyst of high activity at minimum cost. This is achieved by impregnating the catalyst base by admixture of hot cobalt acetate and ammonium molybdate solutions with the carrier, resulting in formation and precipitation of cobalt molybdate as an extremely fine precipitate on and in the carrier material. By specific use of the solutions identified, it is possible to precisely control the formation of cobalt molybdate so as to secure the full advantages of a solution or liquid impregnation technique. The use of the specific solutions referred to is a particular feature of this invention, not only to control and permit suitable impregnation of the carrier with cobalt molybdate, but also so as to avoid problems characteristic of other salt solutions which could be contemplated for use.

In this connection, for example, a cobalt nitrate solution could conceivably be employed with a soluble salt of molybdenum so as to form cobalt molybdate. However, in this case, a nitrate is formed as a result of the reaction creating distinct safety hazards due to the possibility of explosions during drying and calcining which cannot be tolerated on a commercial scale. This is particularly true if cobalt nitrate were to be reacted with ammonium molybdate with the resultant formation of the relatively dangerous ammonium nitrate. Again, it could be contemplated to employ salts of molybdenum other than ammonium molybdate. However, in this case, special provisions would be required to remove cations other than ammonium, imposing a necessary washing or leaching step in the operation.

Such significant and practical difficulties are obviated in the present invention by utilizing solutions of cobalt acetate and ammonium molybdate in order to form the desired cobalt molybdate. Ammonium acetate formed in this process is then eliminated during subsequent catalyst drying and activating treatments, due to the volatility of this compound. As indicated, however, the principal feature of employing cobalt acetate and ammonium molybdate solutions specifically in this invention, is the manner in which formation of cobalt molybdate occurs on admixture of these solutions. It has been found that the speed of cobalt molybdate formation is a function of and can be nicely controlled by the temperature at which the cobalt acetate and ammonium molybdate solutions are maintained on mixing. Thus, for example, if these solutions existing at ambient temperatures are brought together, a relatively stable solution is obtained from which cobalt molybdate will only precipitate after a prolonged period in excess of several hours. However, by heating such admixtures or by preheating the two solutions prior to admixture, cobalt molybdate formation and precipitation can be caused to occur in a time of less than one second. Use of cobalt acetate and ammonium molybdate solutions in this invention therefore provides a desirable and practical control of the rapidity of formation of cobalt molybdate.

A second and related feature unique to use of cobalt acetate and ammonium molybdate solutions is the fact that the nature and size of cobalt molybdate crystals formed is also a function of temperature. In this connection, by causing the formation of cobalt molybdate from mixtures of these solutions, at a temperature above 120° F. and preferably above 150° F., an extremely fine dispersion of cobalt molybdate is obtained. This dispersion, maintained in the aqueous vehicle provided on admixture of the original solutions, is particularly effective for introduction of an active form of cobalt molybdate into a carrier base. The dispersion is of such a character that intimate and homogeneous impregnation or admixture of the cobalt molybdate with the carrier base can be achieved.

In utilizing these principles in accordance with the invention, pre-formed solutions of cobalt acetate and ammonium molybdate are admixed with a suitable carrier. It is the preferred technique of this invention to separately maintain the two solutions at ambient temperatures. These solutions which may be described as "cool solutions" are then admixed with the catalyst carrier. On then heating this mixture to at least about 120° F., and preferably to about 150° F., the desired formation of cobalt molybdate and impregnation of the carrier is achieved. Alternately, however, it is practical to obtain the benefits of the invention by pre-heating the separate solutions of cobalt acetate and ammonium molybdate to temperatures of about 120° to 150° F. or somewhat above. These solutions which may be described as "hot solutions" can then be intermixed in a single step together with the carrier to achieve the desired impregnation. Alternatively, the two hot solutions may be pre-mixed provided that they are thereafter immediately admixed with the carrier material.

Other features relating to the practical use of this invention are of a conventional nature. Thus, for example, any desired carrier of a porous nature adapted to serve as a suitable catalyst support can be employed. Carriers which are particularly contemplated include substantially pure alumina or alumina containing small amounts of silica such as about 0.5 to 5% or other porous carrier materials such as silica, activated carbon and the like. Again, the alumina which is the preferred base may be derived by any of the techniques known to the art. In this connection, however, a preferred form of alumina is so-called alcoholate alumina obtained in accordance with the teachings of U. S. Patent 2,636,865, issued to Charles N. Kimberlin, Jr., April 28, 1953.

It is also to be understood that after impregnation of the catalyst carrier by the technique of this invention, the catalyst may be finished in any desired manner. The drying step may be carried out at temperatures of about 200° to 600° F. The catalyst is then activated in the conventional manner by heating to temperatures above about 600° F., preferably from 1200° F. to 1500° F. for periods of about 1 to 24 hours. During the drying and calcining steps or after these steps, the catalyst may be placed in suitable form for commercial use by extrusion, pilling or granular drying.

Another practical feature of this invention is to add the ambient temperature solutions forming cobalt molybdate to an alumina hydrosol. The particular hydrosol used is not critical and may be derived by any of the techniques well known to the art. In this connection, the sols may be prepared as described by Patrick (U. S. 2,258,099) or Hunter and Kimberlin (U. S. 2,656,321). The mixture of alumina sol and cobalt molybdate solution is then spray-dried directly. During this operation the droplet is heated to high temperatures (200 to 600° F.) which effects precipitation of cobalt molybdate in finely dispersed form throughout the gel particle while drying the particle as well. The product so prepared comprises the final catalyst in microspherical form and obviates further impregnation steps.

In the practice of this invention, the solutions of cobalt acetate and ammonium molybdate may be made up of any convenient concentrations, since the concentration of these solutions during cobalt molybdate formation is not critical. It is generally preferred, however, that the cobalt acetate solution be prepared in concentrations of about 10 to 35 weight percent and that the ammonium molybdate solution have a concentration of about 10 to 30 weight percent. The total volume of the cobalt and molybdenum solutions when mixed should be about that volume which the porous base will imbibe. In intermixing these solutions for impregnation of the carrier with cobalt molybdate, it is particularly preferred to prepare the solutions to provide stoichiometric ratios of cobalt and molybdenum; namely, in weight ratios of about 1.36 parts of cobalt acetate, $Co(C_2H_3O_2)_2 \cdot 4H_2O$, to 1 part of ammonium molybdate. More broadly, however, the weight ratio of cobalt acetate to ammonium molybdate may be varied over the range of about 0.12 to 1 up to about 2 to 1, providing resultant ratios of cobalt to molybdenum ions in the range of about 1 to 10 up to about 1 to 0.6.

The ratio of the solutions of cobalt acetate and ammonium molybdate with respect to the carrier will be adjusted to provide about 5 to 25 weight percent of total catalytic material to carrier. It is preferred however, to employ amounts of the two solutions in stoichiometric ratio as indicated so as to provide about 7 to 15 weight percent of cobalt molybdate and specifically about 15% of cobalt molybdate.

In order to show the nature and advantages of this invention, reference will be made to the following data and to specific examples of the invention.

EXAMPLE 1

In a vessel, 117 grams of ammonium molybdate crystals (82% $MoO_3$) were dissolved in 1 liter of hot water. The solution was allowed to cool to room temperature (80° F.). This solution is referred to as solution "A." In a separate vessel 159.6 grams of cobalt acetate, $Co(C_2H_3O_2)_2 \cdot 4H_2O$, were dissolved in 1 liter of hot water and allowed to cool to room temperature. This solution is referred to as solution "B." Both solution "A" and solution "B" had nominally the same molar concentration.

Equal aliquots of solutions "A" and "B" were individually heated and mixed at a prescribed temperature and the time necessary for a precipitate of cobalt molybdate to form was noted. These data are tabulated below:

*Equal volumes of solutions A and B mixed*

| Temp. °F.: | Time, secs. |
| --- | --- |
| 80 | >$10^4$ |
| 120 | 100 |
| 126 | 30 |
| 140 | 8 |
| 175 | <1 |

The cobalt molybdate solution mixed at room temperature was still free of precipitate after standing overnight. When placed on a hot plate this solution suddenly yielded a dense precipitate of cobalt molybdate.

The data of this example shows the manner in which the temperature of admixture of cobalt acetate and ammonium molybdate controls the time period at which detectable crystals of cobalt molybdate are formed. The data particularly establishes the practicality of maintaining clear solutions of cobalt acetate and ammonium molybdate in admixture at ambient temperatures for a prolonged period prior to precipitation of cobalt molybdate.

EXAMPLE 2

As an example of a preferred technique of practicing the invention by incorporation of cobalt molybdate in a sol of the carrier, an experiment was conducted in which an alumina sol was impregnated with cobalt molybdate in accordance with this invention. In this experiment, one hundred gallons of an alumina sol (3% solids) was placed in a vessel and a stirrer attached. This alumina sol was prepared by hydrolyzing aluminum alcoholate in 1% acetic acid solution and stripping the resulting sol of volatile organic material. In a separate vessel, 13.3 pounds of cobalt acetate, $Co(C_2H_3O_2)_2 \cdot 4H_2O$, were dissolved in 10 gallons of water. In a third vessel, 9.8 pounds of ammonium molybdate were dissolved in 10 gallons of water. The latter two solutions were of about the same molar concentration. Three and one-tenth gallons (3.1 gal.) of cobalt acetate solution were added at room temperature to a like volume of the ammonium molybdate solution, also at room temperature. The mixed solution was then added with stirring to the 3% alumina sol. (On a dry basis, this mixture comprised $85Al_2O_3$–$5CoO$–$10MoO_3$.) The mixture became more viscous, due probably to the alumina sol setting to a soft hydrogel, but remained fluid enough to be pumpable without difficulty. The mixture was heated to about 150° F., at about which temperature there was a color change from reddish-pink to purple, indicating that the cobalt molybdate had precipitated.

It will be seen from these data that the impregnation technique of this invention is a practically desirable method for preparing a cobalt molybdate catalyst employing an alumina sol. By preparing the catalyst as described, an extremely fine dispersion of cobalt molybdate is obtained which can be dispersed through the alumina sol in a homogeneous manner.

EXAMPLE 3

In order to illustrate preferred and critical features of this invention, comparable catalysts were prepared as described in this and the following example. In these experiments, a catalyst base was prepared by the following procedure.

Five thousand eight hundred and forty (5840) gallons of water and 275 gallons of sodium aluminate solution were placed in a large mixing tank. The sodium aluminate solution comprised about 32% $NaAlO_2$ and about 8% free NaOH. The temperature was adjusted at about 80° F. While the solution was agitated by bubbling air through it, 180 gallons of 35% $H_2SO_4$ solution was admixed with it. The pH of the system was brought to about 9.2 by addition of about 1350 gallons of a 2.5% solution of aluminum sulfate. The slurry was heated to 120° F. and dewatered using a rotary vacuum filter so that the cake contained about 6.5% solids. The filter cake was then reslurried and spray dried. The spray dried spheres were redispersed in water and washed free of soluble salts. The pure alumina was dried in a steam-heated oven at 250° F. followed by calcining 16 hours at 650° F. to bring the moisture content to about 4 to 5%.

Seventy-four and one-half (74.5) kilograms of the calcined alumina prepared as described in Example 1 above, were placed in a mixing vessel. In separate vessels 10.68 kg. ammonium molybdate were dissolved in 38.8 liters of hot water and 14.45 kg. cobaltous acetate

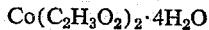

$$Co(C_2H_3O_2)_2 \cdot 4H_2O$$

were dissolved in 26.1 liters of hot water. The two solutions were mixed at a temperature of about 180° F., and the resulting mixture was pumped into the vessel containing the alumina and composited. About 5 to 7 minutes were involved to pump the mixed cobalt and molybdenum solutions into the blending vessel. In this time interval, some cobalt molybdate precipitated. The catalyst paste was dried at 250° F. and made into 3/16 inch by 3/16 inch cylindrical pellets. The pellets were activated by heating 6 hours at 1200° F. This catalyst, which comprised about 5% CoO and 10% $MoO_3$, is designated catalyst "A."

EXAMPLE 4

A comparable catalyst was then prepared employing alumina prepared as described above in Example 3.

Twenty-three kilograms of the calcined alumina were placed in a large mixing vessel. In separate vessels, 3.3 kg. of ammonium molybdate were dissolved in 12 liters of hot water and 4.5 kg. of cobaltous acetate were dissolved in 8 liters of hot water. The hot cobalt acetate and ammonium molybdate solutions were rapidly mixed and rapidly blended (less than 2 minutes after mixing) with the base alumina. In this time interval (<2 min.) no precipitate of cobalt molybdate had settled out in the mixing vessel. The catalyst paste was dried at 250° F. and made into 3/16 inch by 3/16 inch cylindrical pellets. The pellets were activated by heating 6 hours at 1200° F. This catalyst comprised 5% CoO and 10% $MoO_3$ and is designated catalyst "B."

EXAMPLE 5

Catalysts "A" and "B," prepared as described in Examples 3 and 4, were used in a hydrodesulfurization operation. In this operation each catalyst was subjected to vapor phase contact with West Texas light virgin heating oil followed by contact with heavy catalytic naphtha, conducted at 600° F., 200 p. s. i. g. pressure and 1500 C. F./B. added hydrogen. This procedure served to "condition" the catalyst. Desulfurization was then performed (using the conditioned catalyst) on a West Texas heavy virgin gas oil comprising 2.07 wt. percent sulfur at conditions of 700° F., 400 p. s. i. g. pressure, and 1500 C. F./B. added hydrogen. The results are summarized in the following table:

| Catalyst | A | B |
|---|---|---|
| Percent sulfur in product: | | |
| at 1 v./v./hr | 0.41 | 0.20 |
| at 2 v./v./hr | 0.65 | 0.35 |
| at 4 v./v./hr | 1.0 | 0.62 |

It will be noted from this data that catalyst "B" was markedly superior in performance as compared to catalyst "A." In particular, catalyst "B," at comparable conditions, was capable of reducing the sulfur content of the oil treated so as to achieve desulfurization substantially double that obtainable with catalyst "A." This comparison shows the criticality of minor differences in impregnation technique as regards the nature and quality of the resultant catalyst. In particular, it shows the inability to prepare a desirably active cobalt molybdate catalyst, when appreciable formation and precipitation of cobalt molybdate has occurred prior to admixture with the carrier. However, by carrying out the impregnation by the technique of this invention, so that the carrier is brought into immediate contact with solutions of cobalt acetate and ammonium molybdate at temperatures above about 120° F. as shown by Example 4, particularly effective catalysts are obtainable.

In light of the principles and data presented, the following example is presented to illustrate the preferred mode of practicing the present invention. In view of the criticality of preventing cobalt molybdate crystal formation prior to effective admixture with a catalyst carrier, it is particularly preferred to admix cool solutions of cobalt acetate and ammonium molybdate with the carrier. This can be done at ambient temperatures or any lower temperature so as to give full opportunity for intimate admixture of the three components prior to any formation of cobalt molybdate precipitate as shown by the data presented. Thereafter, this admixture is heated to temperatures of at least 120° F., and preferably about 150° F., or even higher, so as to secure prompt formation of cobalt molybdate in a finely dispersed form in the carrier material.

While the present invention has been described with particular reference to preparation of cobalt molybdate catalysts, to which the invention is particularly valuable, it is apparent that the principles of this invention may be employed in producing other catalysts. In particular, it is contemplated that this invention is of application to the mixture of solutions of nickel or iron salts with solutions of molybdates or chromates or tungstates, to obtain mixed solutions which can be used to impregnate carrier material as described.

As particularly illustrated by the data of Example 5 the catalysts of this invention are particularly effective in hydrodesulfurization processes. In such processes, the oil fraction to be refined is contacted with the catalysts and hydrogen at temperatures in the range of about 400° to 800° F., at a pressure of about 200 to 400 p. s. i. and at a throughput of about 1 to 16 v./v./hr. Sufficient hydrogen is provided to attain hydrogen consumptions of about 30 to 500 cu. ft./bbl. of feed. The invention is also of application to the processes of hydroforming and hydrocracking.

What is claimed is:

1. A method of preparing a cobalt molybdate catalyst in which aqueous solutions of cobalt acetate and ammonium molybdate in weight ratio of cobalt acetate to ammonium molybdate within the range of about 0.12:1 to about 2:1 are rapidly mixed together with an activated catalyst carrier at a temperature above about 120° F.

2. The process defined by claim 1 in which the said carrier is admixed with the said solutions as a sol.

3. The process defined by claim 1 in which the said carrier is mixed with the said solutions in the form of a hydrogel.

4. The process defined by claim 1 in which the said carrier is mixed with the said solutions as a slurry of the base carrier.

5. The process defined by claim 1 in which the said carrier constitutes alumina.

6. The process defined by claim 1 in which the said solutions are pre-mixed at substantially ambient temperatures and are thereafter heated with the said carrier to a temperature above about 120° F.

7. The process defined by claim 1 in which the said solutions of cobalt acetate and ammonium molybdate are separately heated to a temperature above about 120° F., and are then immediately intermixed together and with the said carrier.

References Cited in the file of this patent

UNITED STATES PATENTS

| | | |
|---|---|---|
| 1,330,772 | Bosch et al. | Feb. 10, 1920 |
| 1,386,555 | Davis | Aug. 2, 1921 |
| 2,260,409 | Stotterbech et al. | Oct. 28, 1941 |
| 2,369,432 | Byrns | Feb. 13, 1945 |
| 2,744,052 | Nozaki | May 1, 1956 |
| 2,748,108 | Paul et al. | May 29, 1956 |
| 2,758,957 | Nozaki | Aug. 14, 1956 |